United States Patent
McFarlane et al.

(10) Patent No.: US 11,135,911 B2
(45) Date of Patent: Oct. 5, 2021

(54) HEAVY HAUL VEHICLE

(71) Applicant: Rexx Innovation Pty Ltd

(72) Inventors: Scott McFarlane, Nedlands (AU);
William Keys, East Victoria Park (AU);
Bradley Smith, High Wycombe (AU);
Graeme Brentson, Shelley (AU)

(73) Assignee: REXX INNOVATION PTY LTD, Osborne Park (AU)

( * ) Notice: Subject to any disclaimer, the term of this patent is extended or adjusted under 35 U.S.C. 154(b) by 0 days.

(21) Appl. No.: 16/643,504

(22) PCT Filed: Apr. 11, 2019

(86) PCT No.: PCT/AU2019/050320
§ 371 (c)(1),
(2) Date: Feb. 28, 2020

(87) PCT Pub. No.: WO2019/195886
PCT Pub. Date: Oct. 17, 2019

(65) Prior Publication Data
US 2021/0016650 A1 Jan. 21, 2021

(30) Foreign Application Priority Data
Apr. 11, 2018 (AU) .................. 2018901201

(51) Int. Cl.
*B60K 5/08* (2006.01)
*B60K 17/34* (2006.01)
(Continued)

(52) U.S. Cl.
CPC .............. *B60K 5/08* (2013.01); *B60K 17/358* (2013.01); *B60K 17/36* (2013.01); *B62D 7/144* (2013.01);
(Continued)

(58) Field of Classification Search
CPC ........ B60K 5/08; B60K 17/358; B60K 17/36; B62D 7/144
See application file for complete search history.

(56) References Cited

U.S. PATENT DOCUMENTS

| 1,733,032 A | 10/1929 | Staniewicz |
| 2,351,233 A | 6/1944 | Schon |

(Continued)

FOREIGN PATENT DOCUMENTS

| AU | 2019246846 B2 | 11/2019 |
| CN | 203974518 U | 12/2014 |

(Continued)

OTHER PUBLICATIONS

Wieser et al., Fire-fighting vehicle, especially for airports, with at least two drive motors arranged on either side of a longitudinal axis, Jan. 15, 1997, EPO, EP 0 753 423 A1, English Abstract (Year: 1997).*

(Continued)

*Primary Examiner* — James A English
(74) *Attorney, Agent, or Firm* — Knobbe, Martens, Olson & Bear LLP

(57) ABSTRACT

A heavy haul vehicle has a chassis capable of supporting a load to be transported by the vehicle. A first group of one or more first drive axles and a second group of one or more second drive axles are coupled to the chassis. The vehicle also has a first engine and a second engine. The first engine drives each axle in the first group of drive axles. The second engine drives each axle in the second group drive axles.

18 Claims, 6 Drawing Sheets

(51) Int. Cl.
*B60K 17/36* (2006.01)
*B62D 7/14* (2006.01)
*B62D 7/15* (2006.01)
*B62D 21/12* (2006.01)
*B62D 21/14* (2006.01)
*B62D 61/10* (2006.01)

(52) U.S. Cl.
CPC ........... *B62D 7/1581* (2013.01); *B62D 21/12* (2013.01); *B62D 21/14* (2013.01); *B62D 61/10* (2013.01)

(56) References Cited

U.S. PATENT DOCUMENTS

| | | | |
|---|---|---|---|
| 2,354,300 | A | 7/1944 | Bock |
| 2,383,873 | A | 8/1945 | MacPherson |
| 6,135,484 | A * | 10/2000 | Lauronen ............... B62D 13/02 |
| | | | 280/444 |
| 6,199,894 | B1 | 3/2001 | Anderson |
| 6,308,976 | B1 * | 10/2001 | Mitchell ................ B62D 13/04 |
| | | | 280/419 |
| 9,522,707 | B2 * | 12/2016 | Kern ..................... B60B 35/003 |
| 2007/0084647 | A1 * | 4/2007 | Atley ..................... B62D 59/04 |
| | | | 180/24.01 |
| 2009/0224510 | A1 | 9/2009 | Caporali |
| 2013/0240279 | A1 * | 9/2013 | Casey ..................... B60K 6/48 |
| | | | 180/69.6 |
| 2018/0154780 | A1 * | 6/2018 | Daigle ................... B63H 21/17 |
| 2020/0269686 | A1 * | 8/2020 | Putz ..................... B60K 17/358 |

FOREIGN PATENT DOCUMENTS

| | | |
|---|---|---|
| DE | 200 12 172 | 1/2001 |
| EP | 0 753 423 A1 | 1/1997 |
| EP | 2 722 256 A2 | 4/2014 |
| EP | 2 554 458 B1 | 2/2018 |
| GB | 750039 | 2/1954 |

OTHER PUBLICATIONS

Wieser et al., Fire-fighting vehicle, especially for airports, with at least two drive motors arranged on either side of a longitudinal axis, Jan. 15, 1997, EPO, EP 0 753 423 A1, Machine Translation of Description (Year: 1997).*

International Search Report and Written Opinion, dated Jun. 27, 2019, in International Patent Application No. PCT/AU2019/050320.

Notice of Acceptance for Patent Application, dated Nov. 20, 2019, in Australian Application No. AU 2019246846.

Examination Report No. 1 For Standard Patent Application, dated Oct. 25, 2019, in Australian Application No. 2019246846.

* cited by examiner

HEAVY HAUL VEHICLE

PRIORITY AND CROSS REFERENCE TO RELATED APPLICATIONS

This application is the U.S. National Stage Application under 35 U.S.C. § 371 of International Application No. PCT/AU2019/050320, filed Apr. 11, 2019, designating the U.S. and published in English as WO 2019/195886 A1 on Oct. 17, 2019, which claims the benefit of Australian Application No. AU 2018901201, filed Apr. 11, 2018. Any and all applications for which a foreign or a domestic priority is claimed is/are identified in the Application Data Sheet filed herewith and is/are hereby incorporated by reference in their entirety under 37 C.F.R. § 1.57.

TECHNICAL FIELD

The present disclosure relates to heavy haul vehicles, such as but not limited to off-road dump trucks, road-going haulage vehicles and freight trucks.

BACKGROUND

There are various types of on-road and off-road heavy haul vehicles. For example, off-road heavy haul vehicles such as dump trucks typically used in open-pit mining vary in size and payload capacity. Smaller dump trucks such as the Caterpillar® 777 haul truck are capable of carrying a payload of around 90 tonne (T), while medium-sized dump trucks have a payload capacity of around 160 T-220 T payload, and larger dump trucks may have a payload capacity of around 350 T-360 T.

Also known are off-road haulage road trains, such as dual powered road trains, which may carry much larger payloads of up to 500 T through the linking of multiple chassis each carrying a bucket or tipping body.

SUMMARY

In general terms, embodiments of the disclosed heavy haul vehicle may provide multiple drive axles coupled to the same chassis, and at least two engines each of which drive different drive axles. This may enable or at least facilitate transport of relative large payloads such as 100 T-190 T during wet weather conditions and/or over challenging terrain. It may also enable or at least facilitate transport of payloads supported by a single chassis, which would ordinarily require transport by road trains having multiple chassis and containers.

According to a first aspect of the disclosure, there is provided a heavy haul vehicle comprising:
 a chassis capable of supporting a load to be transported by the vehicle;
 at least two drive axles coupled to the chassis, the at least two drive axles comprising at least one frontward drive axle and at least one rearward drive axle;
 a first engine and a second engine, the first engine arranged to drive a first of the at least one frontward drive axles, and the second engine arranged to drive a first of the at least one rearward drive axles.

At least one frontward drive axle may comprise a first frontward drive axle disposed and a second frontward drive axle behind the first frontward drive axle, and the first engine is arranged to drive the first and the second frontward drive axles.

A drivetrain may be arranged to impart torque in series from the first engine to the second frontward drive axle and then to the first frontward drive.

The at least one rearward drive axle may comprise two or more rearward drive axles, and the second engine is arranged to drive the two or more rearward drive axles.

A steering system may be configured to steer one or more of the at least one of the frontward drive axles and at least one of rearward drive axles.

The steering system may be capable of steering both the first and second frontward drive axles.

A first closed-loop steering control system may be arranged to steer the second frontward drive axle based on a steering angle of the first frontward drive axle.

The steering system may comprise a second closed-loop steering control system configured to steer a steered rearward drive axle based on a or the steering angle of the first frontward drive axle.

At least one non-steered drive axle may be disposed between the steered rearward drive axle and the frontward drive axles.

The heavy haul vehicle may be capable of being driven with power from one of the first and second engines and without power from the other of the first and second engines.

The first engine and the second engine may be disposed side-by-side.

The vehicle may be a dump truck capable of transporting at least a 100 T payload.

Each drive axle may support two wheels at each end of the drive axle.

Each wheel may be supported by each drive axle comprises an 18.00R25 tyre. Alternative tyre sizes are also applicable and may be larger or smaller.

The heavy haul vehicle may further comprise a chassis extension coupling system at an end of the chassis capable of releasably rigidly coupling a chassis extension, having an additional axle, to the chassis to enable an increase in load carrying capacity of the vehicle when the chassis extension is coupled to the chassis by the chassis extension coupling system.

The chassis extension may be coupled to the chassis by the chassis extension coupling system.

According to a second aspect of the disclosure, there is provided a method of driving a haul vehicle comprising a chassis capable of supporting a container for transporting a load, the method comprising:
 driving a first frontward drive axle coupled to the chassis with a first engine;
 driving a first rearward axle coupled to chassis with a second engine.

According to a third aspect of the disclosure, there is provided a heavy haul vehicle comprising:
 a chassis capable of supporting a load to be transported by the vehicle, and at least two wheel axles coupled to the chassis; and
 a chassis extension coupling system at an end of the chassis capable of releasably rigidly coupling a chassis extension, having an additional wheel axle, to the chassis to enable an increase in load carrying capacity of the vehicle when the chassis extension is coupled to the chassis by the chassis extension coupling system.

The heavy haul vehicle may further comprise the chassis extension coupled to the chassis by the chassis extension coupling system.

The at least two wheel axles coupled to the chassis may each be drive axles.

The additional wheel axle may be an idle or non-driven axle.

The heavy haul vehicle may further comprise a load carrying container supported by the chassis, the load carrying container comprising at least two demountable sections.

The heavy haul vehicle may further comprise a container extension section configured to connect to and fit between the at least two demountable sections when the chassis extension is coupled to the chassis.

According to a fourth aspect of the disclosure, there is provided a heavy haul vehicle comprising:
- a chassis capable of supporting a load to be transported by the vehicle;
- a first group of one or more first drive axles and a second group of one or more second drive axles each group of drive axles being coupled to the chassis;
- a first engine and a second engine, the first engine arranged to drive each axle in the first group of drive axles, and the second engine arranged to drive each axle in the second group drive axles.

In accordance with this aspect the axles in the respective groups can, but do not need to, be mutually adjacent to each other. For example, with reference to a five-axle vehicle with nominally the first axle being a forward most axle and the fifth axle being the rearward most axle, then first group of axles may comprise three first axles; and the second group of axles may comprise two second axles. In one specific example each of the three first axles may be mutually adjacent each other, with each of the two second axles being mutually adjacent each other and either in front of or behind the three first axles. The first group of axles can be either in front or behind of the second group of axles. In one scenario this can be realised by the three first axles being the first, second and third axles of the vehicle and the two second axles being the fourth and fifth axles of the vehicle. In an alternate arrangement this can be realised by the three first axles being the third, fourth and fifth axles of the vehicle, with the two second axles being the first and second axles of the vehicle.

The table below summarises some of the possible permutations for a five axle vehicle with the first group of axles comprising three of the vehicle axles, and the second group of axles comprising two of the vehicle axles, the first engine drives each of the first group axles and the second engine drives each of the second group axles.

| Axle grouping | Vehicle Axle No. | | | | |
| --- | --- | --- | --- | --- | --- |
|  | 1 Front most | 2 | 3 | 4 | 5 Rear most |
| (a) | G1 | G1 | G1 | G2 | G2 |
| (b) | G2 | G2 | G1 | G1 | G1 |
| (c) | G1 | G2 | G1 | G2 | G1 |
| (d) | G1 | G2 | G2 | G1 | G1 |
| (e) | G2 | G1 | G1 | G2 | G1 |
| (f) | G2 | G1 | G1 | G1 | G2 |

In axle grouping (a) shown in the table above the three axles in the first group G1 are mutually adjacent to each other and form the front most three axles while the two axles in the second group G2 are mutually adjacent to each other and behind the group to axles, forming the two rearward most axles of the vehicle.

In axle grouping (b) the situation is reversed with the two axles in the second group G2 being the two front most axles, i.e. the first and second axles; and the three axles in the first group G1 being the three rear most axles, i.e. the third, fourth and fifth axles.

Axle grouping (c) shows an embodiment where the none of the axles in the first or second groups are mutually adjacent.

It should be recognised that the first aspect is a specific form of the more generic fourth aspect; and further that the second and third aspects can be practised in relation to the heavy haul vehicle in accordance with the fourth aspect.

In embodiments of the fourth aspect when the number of drive axles is "N" where in is an integer ≥2 then,
- when N is an even number each of the first and second groups of axles may have the same number of axles N/2
- when N is an odd number then one of the first and second groups of axles will have one more axle than the other.

DETAILED DESCRIPTION

Figure 1:
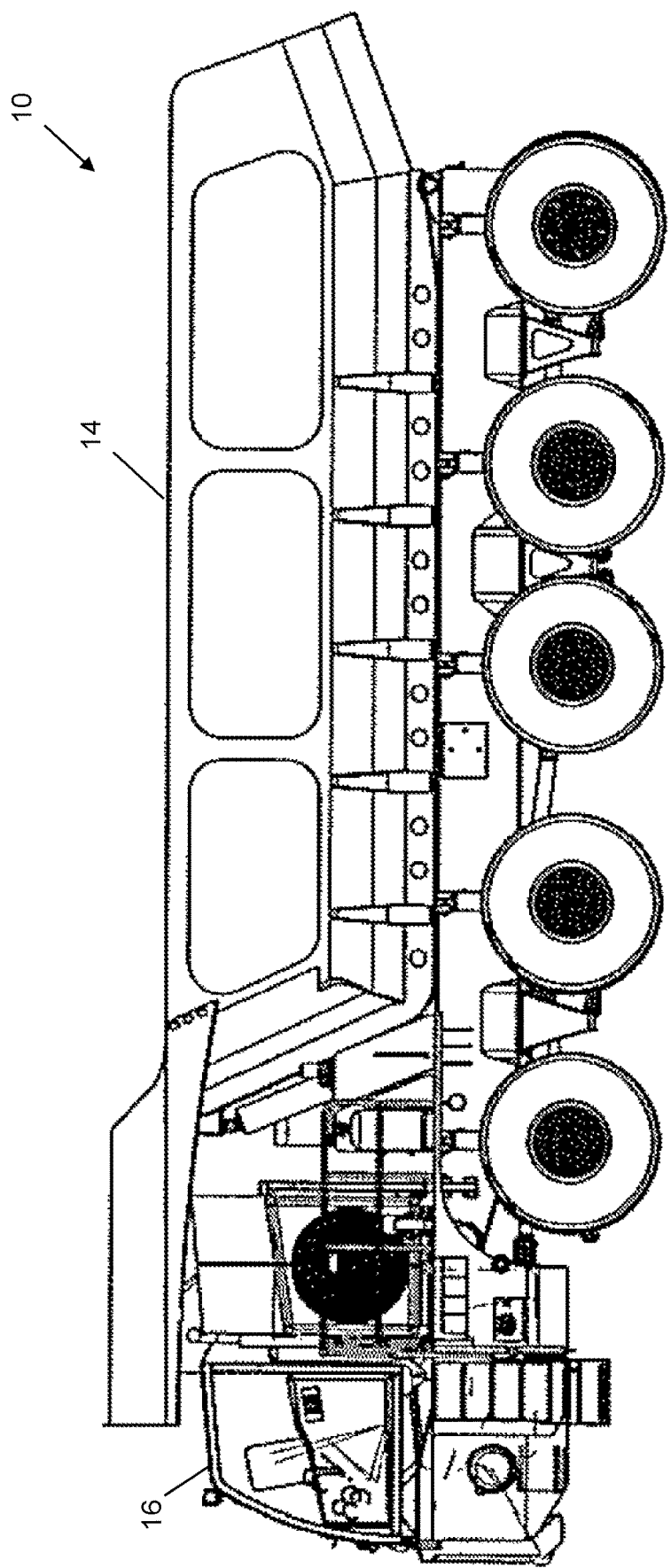
FIG. 1 is a side view of an embodiment of the disclosed heavy haul vehicle.
Figure 2:
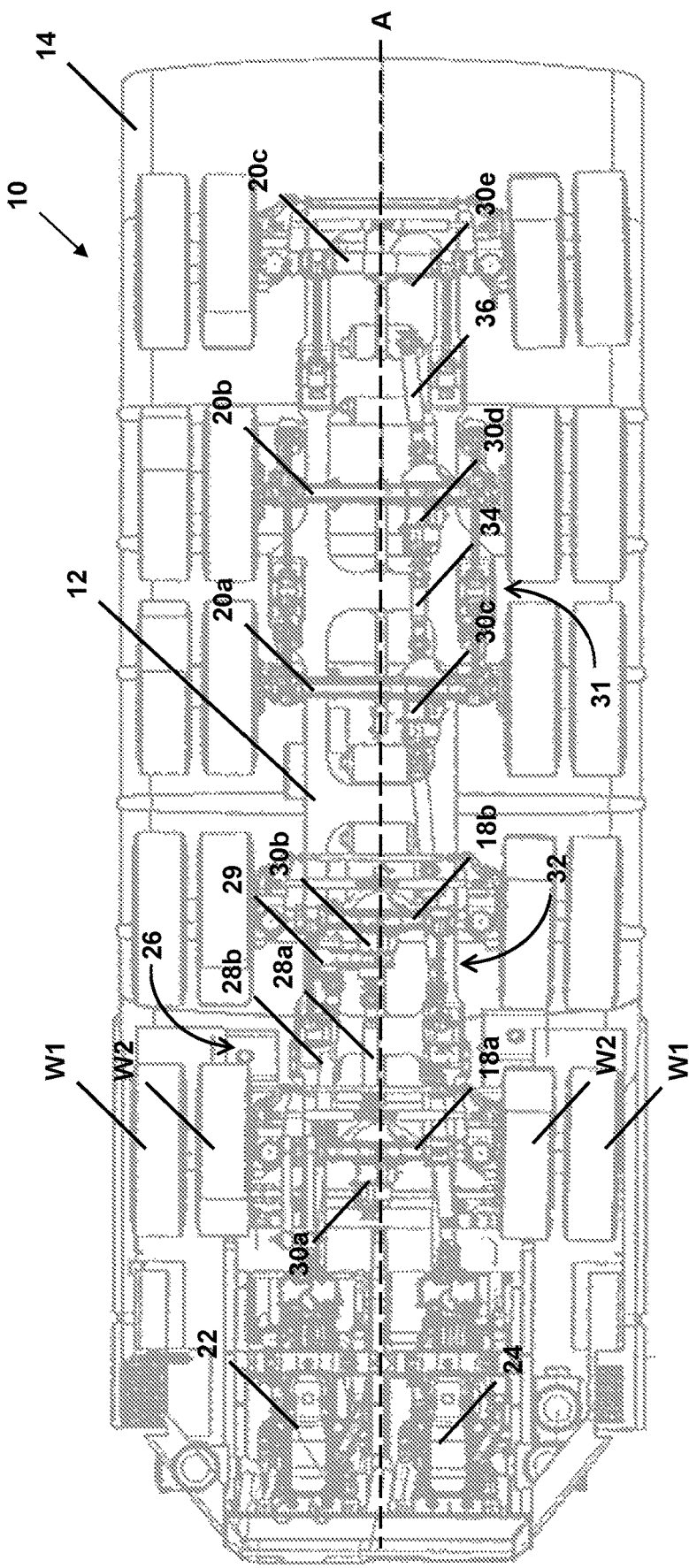
FIG. 2 is a bottom view of the heavy haul vehicle shown in FIG. 1.
Figure 3:
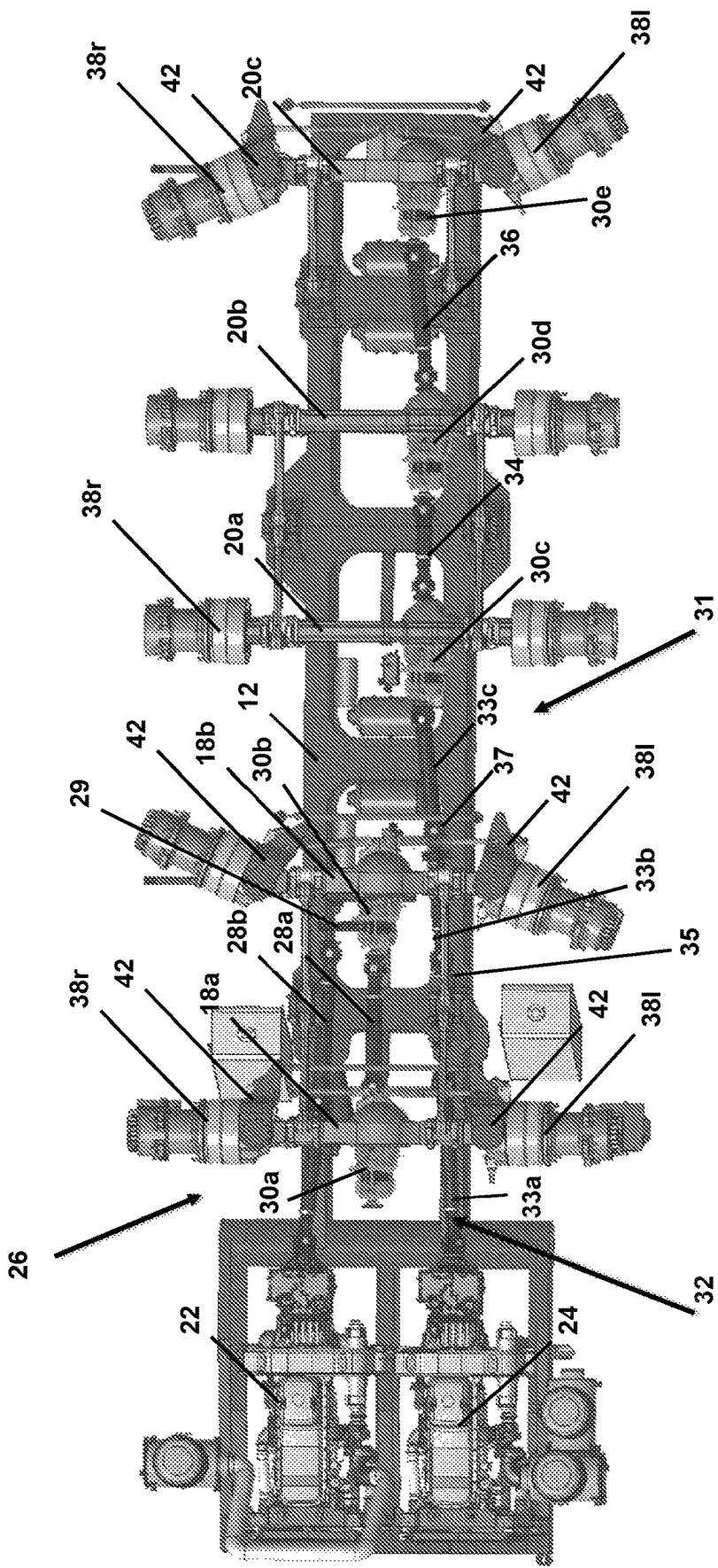
FIG. 3 is a bottom view of specific components of the heavy haul vehicle shown in FIG. 1 during steering.

FIGS. 1 to 3 illustrate an embodiment of the disclosed heavy haul vehicle is the form of a dump truck 10. However, the disclosed heavy haul vehicle may be embodied as other types of vehicles, such as an on-road freight truck. The dump truck 10 comprises a chassis 12 capable of supporting a load, such as bulk materials. In this example, the load is carried in a box 14 of the truck 10, which can be tilted by extending hydraulic rams (not shown) connected between the box 14 and chassis 12 to discharge the load.

With reference to FIGS. 2 and 3, the dump truck 10 has at least two drive axles coupled to the chassis 12. The at least two drive axles include at least one frontward drive axle and at least one rearward drive axle. In this example, the dump truck 10 has two frontward drive axles: a first frontward axle 18*a* and a second frontward axle 18*b* (collectively, 'frontward drive axles 18'). The dump truck 10 also has three rearward drive axles: a first rearward axle 20*a*, a second rearward axle 20*b*, and a third rearward axle 20*c* (collectively, 'rearward drive axles 20'). Dual wheels W1 and W2 are couple to each axle end.

Equivalently, with reference to the above disclosed fourth aspect, the axles 18*a* and 18*b* can be considered as forming the first group of axles with the axles. 20*a*, 20*b* and 20*c*, forming the second group of axles.

The dump truck 10 also has a first engine 22 and a second engine 24. In this example, the first and second engines 22, 24 are disposed side-by-side below a cabin 16 of the dump truck 10, one on each side of a central longitudinal axis A of the dump truck 10. The first engine 22 is arranged to drive each of the frontward (or first group of) drive axles 18. The second engine 24 is arranged to drive each of the rearward (or second group of) drive axles 20.

Throughout this specification, unless the context requires otherwise, the terms 'frontward', 'rearward', 'front', 'back', 'in front' and 'behind', 'underneath', 'above' or 'below', or variants thereof, have meanings according to what a person skilled in the art would understand based on an ordinary forward-going direction of a dump truck. For the avoidance of doubt, it is noted that the driver's cabin 16 is located at a front end of the dump truck 10.

The dump truck 10 has a first drivetrain 26 arranged to impart torque to the frontward drive axles 18. In this embodiment the first drive train 26 imparts torque in series from the first engine 22 to the second frontward drive axle 18*b* and then to the first frontward drive axle 18*a*. The first drivetrain 26 has a first drive shaft 28*a* and a second drive shaft 28*b*. The second drive shaft 28*b* extends from the first engine 22 to the second frontward axle 18*b*, bypassing the first frontward axle 18*a*. The first engine 22 is disposed offset from the central axis A. The second drive shaft 28*b* is connected to a differential 30*b* of axle 18*b* via a gear 29. The first drive shaft 28*a* is connected between the differential 30*b* and a differential 30*a* of the axle 18*a*. In this manner, the first engine 22 drives both the first and second frontward drive axles 18*a*, 18*b*. As is evident from FIGS. 2 and 3 the second drive shaft 28*b* is offset from the central axis A of the chassis while the first drive shaft 18*a* lies between the second drive shaft 18*b* and the central axis A.

The dump truck 10 also has a second drivetrain 31 arranged to impart torque from the second engine 24 to the first, second and third rearward drive axles 20*a*, 20*b* and 20*c* in series. The second drivetrain 31 comprises a first drive shaft mechanism 32, a second drive shaft 34, and a third drive shaft 36. The first drive shaft mechanism 32 is composed of a number of shafts 33*a*, 33*b* and 33*c*, which together extend from the second engine 24 to the first rearward axle 20*a*. The shaft 33*a* connects the second engine 24 to one end of a chassis-mounted spindle 35. The shaft 33*b* connects an opposite end of the spindle 35 to the shaft 33*c* via a universal joint 37. The shaft 33*c* is connected to a differential 30*c*, which in turn drives the wheels W1, W2 on the first rearward drive axle 20*a*. The second drive shaft 34 then imparts torque from the differential 30*c* of first rearward drive axle 20*a* to differential 30*d* of the second rearward drive axle 20*b*. Similarly, the third drive shaft 36 of the drive train 34 then imparts torque from the differential 30*d* of the second rearward drive axle 20*b* to the differential 30*e* of the third rearward drive axle 20*c*. As shown in FIGS. 2 and 3, the second drive train 31 extends progressively closer to the centreline A as the drivetrain approaches a back of the dump truck 10.

Provision of independent first and second engines 22, 24 to drive different axles may provide several advantages. Firstly, the use of multiple engines in this manner may enable or at least facilitate transport of relative large payloads such as 130 T-190 T during wet weather conditions and/or over challenging terrain including steep grades. Secondly, it may also enable or at least facilitate transport of payloads supported by a single chassis, which would ordinarily require transport by road trains having multiple chassis. Thirdly, the first and second engines 22, 24 are independently operable such that one engine, in this example the first engine 22, is capable of being run to drive respective drive axles while the other engine, in this example the second engine 24, is turned off. This enables the dump truck 10 to be driven with both first and second engines 22, 24 operating when the truck 10 carries a substantially full load, and one engine to be turned off for instance during a return trip when the box 14 is empty and the truck 10 does not require both engines to run, thus conserving fuel and reducing wear on the engine, transmission and tyres.

Figure 4:
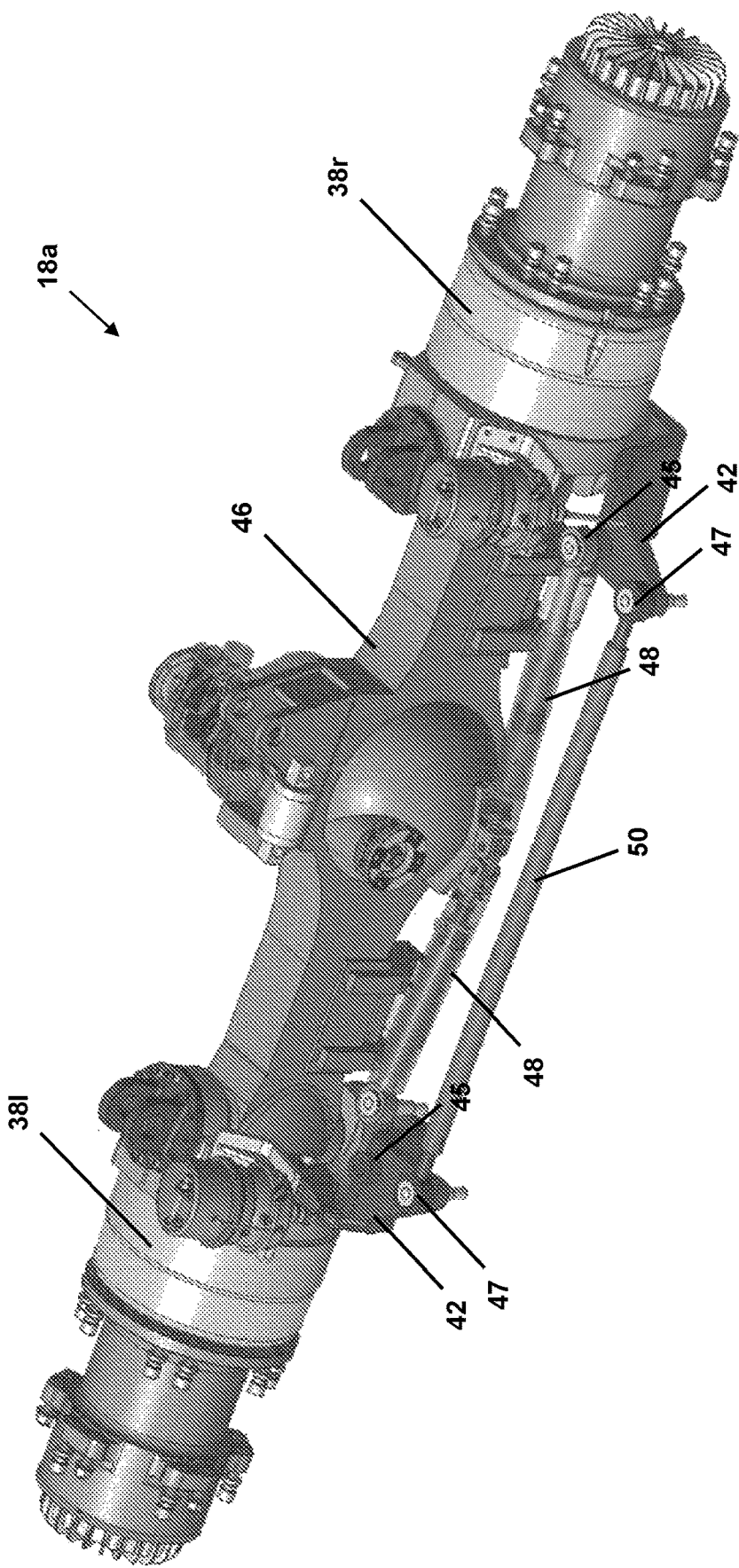
FIG. 4 is a perspective view of a drive axle of the heavy haul vehicle shown in FIG. 1.

With reference to FIGS. 3 and 4, the dump truck also comprises a steering system configured to steer one or more of the frontward drive axles 18 and at least one of rearward drive axles 20. In this example, the steering system can steer the first and second frontward drive axles 18*a*, 18*b*, and the third rearward drive axle 20*c* (which may hereinafter be referred to as 'steered axles'). Accordingly, the first and second rearward drive axles 20*a* and 20*b* are unsteered. However, it will be appreciated that in other embodiments a different combination of drive axles may be steered.

For convenience, specific steering components of the steered axle 18*a* shown in FIG. 4 will be described, with the understanding that the same applies to the other steered axles 18*b* and 20*c*.

In this example, the steered axle 18*a* comprises a first hub 38*l* at one end of the steered axle 18*a* and a hub 38*r* at an opposite end of the axle 18*a* (collectively, "hub(s) 38"). Each hub 38 is pivotally movable relative to a main body 46 of the axle 18*a*. Each hub 38 is capable of supporting two wheels. The steered axle 18*a* has a pair of steering joints. Each steering joint comprises a bracket 42 rigidly fixed to a corresponding hub 38, and kingpin (not shown) pivotally connecting the corresponding hub 38 to the axle body 46. Each bracket 42 is also connected to the main body 46 of the steered axle 18*a* by a hydraulic ram 48. A rod end of the ram 48 is pivotally attached to the respective bracket 42 at a pivot point 45. A cylinder end of the ram 48 is attached to the main body 46 at a point approximately in line with the central axis A of the truck 10. The hubs 38*l* and 38*r*, are also connected to each other through a tie rod 50, which is pivotally attached at each end to respective brackets 42 at pivot points 47. The rams 48 are operated in unison in a manner so that as one extends the other retracts. This causes the respective hubs 38 to pivot about their kingpins in the same direction.

Steering commands or directions may be transferred from the steering wheel of the truck to the first frontward drive axle 18*a* using any suitable steering arrangement for heavy haul vehicles, such as but not limited to mechanical systems, hydraulics, electrical/electronic systems, or a combination thereof. However, in this example the steering system further includes a first closed-loop steering control system arranged to steer the second frontward drive axle 18*b* based on a steering angle of the first frontward drive axle 18*a*. Similarly, the steering system includes a second closed-loop steering control system arranged to steer the third rearward drive axle 20*c* based on a steering angle of the first frontward drive axle 18*a*. The steering angle of the first frontward drive axle 18*a* may be sensed using any suitable sensing mechanism, such as but not limited to an angular position sensor. The sensed steering angle of the first frontward axle 18*a* can then be communicated to the first and second closed-loop steering systems, for example through a wired or wireless communication system, which then causes the hubs 38 to pivot accordingly. It will be appreciated that the closed-loop steering systems are configured such that the first and second closed-loop steering systems cause respective steered axles 18*b* and 20*c* to steer in opposite directions to effectively turn the truck 10, as shown in FIG. 3.

Each wheel of the truck may be off-road tyres, such as but not limited to 18R-25 tyres for off-road earth-moving or industrial vehicles. Such tyres may provide the advantage of a higher haulage limit and do not have a tonne kilometre per hour (TKPH) limit as traditional larger mining tyres, where TKPH is a measure of how much load a tyre can handle without overheating.

In the embodiments of the dump truck 10 described above, it is believed that the dump truck is capable of supporting and transporting a payload of around 150 T-160 T where the truck 10 comprises five driven axles coupled to the same chassis. According to a specific example, the dump truck 10 has an overall length of approximately 12-14 metres and an overall width over approximately 6-9 metres. An embodiment of the disclosed dump truck constructed and tested ("the test dump truck") in at a mine site has a length of 14.3 m, height of 4.9 m, with 4.8 m, a gross weight of the 70 tonne, payload capacity of 160 tonnes, maximum speed of 60 km/h and a turning circle of 13.5 m. The test dump truck is powered by dual Cummins QSX-15 engines providing a combined 1100 BHP which provide power to five driven axles each end of which was fitted with dual wheels having Bridgestone 18R-25 tyres. The test truck was able to handle gradients of 15% when fully loaded with the multi-axle design distributing load evenly across the five axles and twenty (20) tyres. Embodiments of the disclosed heavy all vehicle and indeed the test dump truck can take payload out-of-pit direct to a processing plant thereby eliminating rehandling, reducing the need for multiple fleets and reducing fixed infrastructure costs. Due to the on-demand power capabilities (i.e. selectively turning off one of the two engines) fuel consumption can be lowered by about 50% compared to that required to move an equivalent load using prior art trucks. This provides a consequential reduction in greenhouse gas emissions.

However, it will be appreciated that other embodiments of the truck, or components thereof, may vary in the size and dimension.

It will be understood to persons skilled in the art of the technical field that many modifications may be made without departing from the spirit and scope of the present disclosure.

For example, the truck may instead comprise four driven axles consisting of the first and second (steered) frontward drive axles and the first and second (unsteered) rearward drive axles coupled to the chassis. The truck according to this embodiment may be capable of carrying a payload of around 130 T. In another example, the truck may include six axles coupled to the chassis, including five driven axles and a sixth idle axle behind all other axles. The truck according to this embodiment may be capable of carrying a payload of around 190 T.

Figure 5:
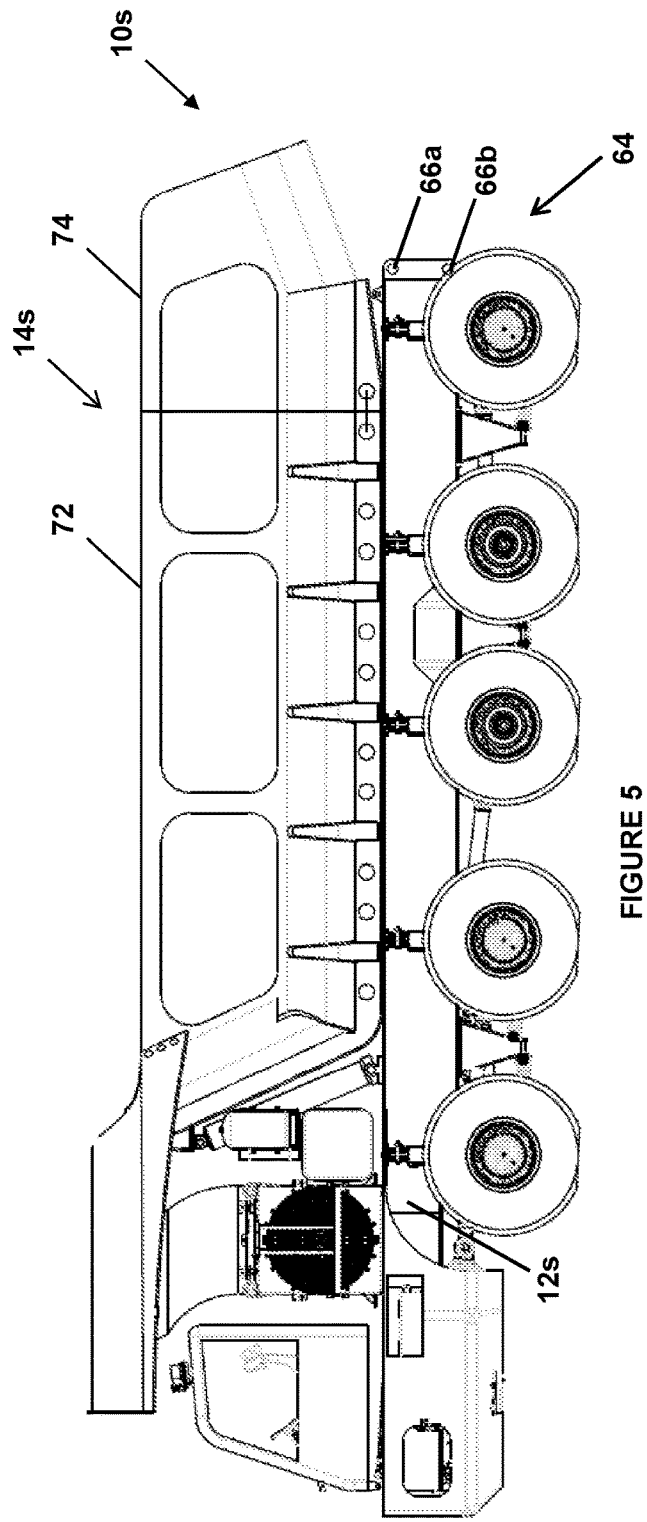
FIG. 5 is a side view of another embodiment of the disclosed heavy haul vehicle.
Figure 6:
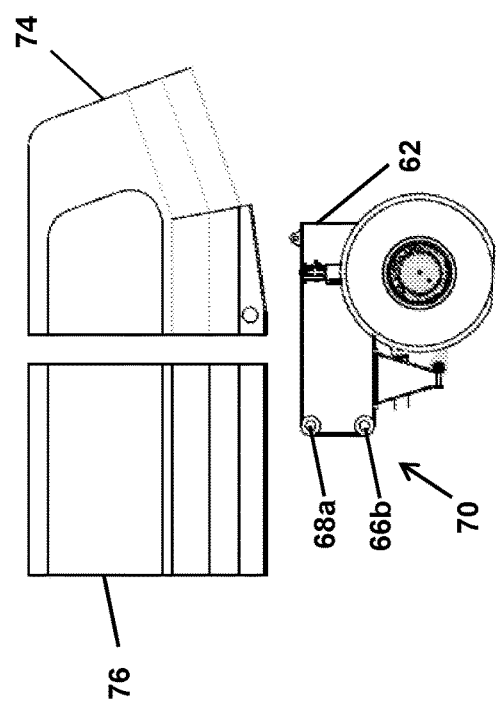
FIG. 6 is a side view of components of the embodiment of the disclosed heavy haul vehicle.
Figure 7:
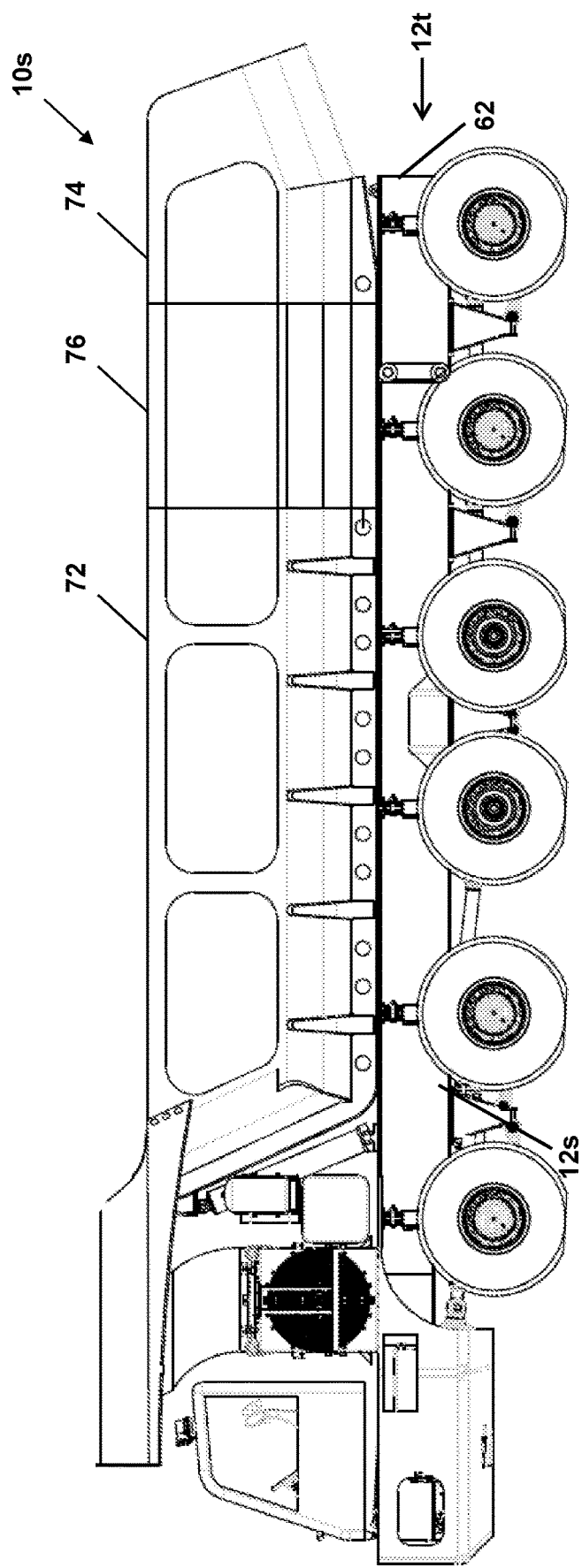
FIG. 7 is a side view of an embodiment of a heavy haul vehicle disclosed herein.

FIGS. 5 to 7 illustrate further embodiment of the heavy haul vehicle 10s. The same reference numbers used in describing the heavy haul vehicle 10 are used to denote the same features in the heavy haul vehicle 10s.

The substantive difference between the heavy haul vehicle 10 and the heavy haul vehicle 10s is the ability to extend or vary the load carrying capacity of the heavy haul vehicle 10s. This is by the provision of a chassis extension coupling system that enables the chassis to be extended in length. This then allows the capacity of the box to be extended. In one example described below, this can be achieved by forming a box as at least two demountable sections and subsequently decoupling two of the sections and coupling a box extension section between and to the two the demountable sections.

In the example shown in FIGS. 5 to 7, the heavy haul vehicle 10s comprises: (a) a chassis 12s capable of supporting a load to be transported by the vehicle 10s, and at least two drive axles (not shown) coupled to the chassis 12s; and (b) a chassis extension coupling system at an end of the chassis 12s capable of releasably rigidly coupling a chassis extension 62, having an additional wheel axle (not shown), to the chassis 12s to enable an increase in load carrying capacity of the vehicle 10s when the chassis extension 62 is coupled to the chassis 12s by the chassis extension coupling system. The additional wheel axle may be an idle or non-driven axle.

The chassis extension coupling system may include any suitable fastening mechanism at the end of the chassis 12s, such as but not limited to through-holes and bolts, for rigidly coupling the chassis extension 62 to the chassis 12s. In this example, the chassis extension 62 may be coupled to a rear end 64 of the chassis 12s by aligning through-holes 66a, 66b provided at the rear end 64 of the chassis 12s with respective through-holes 68a, 68b provided at a front end 70 of the chassis extension 62, and inserting suitable bolts therethrough. FIG. 7 illustrates the chassis extension 62 attached to the chassis 12s in this manner to form an extended chassis 12t.

The vehicle 10s also comprises a modular box 14s having at least two demountable sections. In this example, the demountable sections comprise a main compartment 72 and an end compartment 74 detachably coupled to the main compartment 72. The end compartment 74 is coupled to the main compartment 72 via any suitable mechanism, for example, with suitable through-holes and fasteners. However, the end compartment 74 is also detachable from the main compartment 72 to allow for a box extension section 76 to be fitted therebetween, thus forming an extended box 14t, which can be supported by the extended chassis 12t.

The box extension section 76 comprises a U-shaped body, which connects at one end to the main compartment 72 and at an opposite end to the end compartment 74, as shown in FIG. 7. The extension section 76 may be connected and/or fixed to the main compartment 72 and the end compartment 74 via any suitable mechanism. For example, the compartments 72, 74 and extension section 76 may be provided with mutually interfitting or interlocking edge profiles, such as but not limited to tongue-and-groove. Alternatively, or additionally, the extension section 76 may be secured to the main compartment 72 and/or the end compartment 76 by any suitable fastening mechanism.

In this manner, the heavy haul vehicle 10s, shown in FIG. 5, may be transformed into an extended heavy haul vehicle 10s, as shown in FIG. 7, to accommodate increasing payload demands, by providing an additional axle and chassis extension.

It will be appreciated that the heavy haul vehicle may be provided in kit form, the kit including the vehicle 12s in its unextended form and extension parts such as the chassis extension 62 and box extension section 76 disconnected from the vehicle 12s.

In another variation instead of a first group of axles constituted by the axles 18a, 18b being driven by engine 22 and a second group of axles constituted by axles 20a-20c being driven by the engine 24 as shown in FIGS. 2 and 3; the first group of axles could be constituted by axles 18a, 18b and 20a (i.e. the three front most axles), and the second group of axles may be constituted by axles 20b and 20c (i.e. the two rear most axles).

Moreover, the axles may be designated as being in either a first or second group of drive axles where each group of drive axles has one or more drive axles. Each group of drive axles is characterised by being driven by a common motor/engine 22, 24. Although in the embodiments depicted in the accompanying drawings the drive axles in the respective groups are mutually adjacent to each other this need not necessarily be the case. For example, with reference to FIG. 3 by appropriate modification of the drive train the engine 22 can be arranged to drive axles 18a, 18b and 20b which would constitute a first group of axles and are clearly not mutually adjacent; and the engine 24 can be arranged to drive the axles 20a and 20c, which would form the second group of axles and also are not mutually adjacent each other. For a five-axle vehicle some possible arrangements of the first and second groups (G1 and G2) of axles where the first group has three axles and second group has two axles shown in table below. As is apparent it is possible in various embodiments for one of the axles of the second group to lie between two axles of the first group. This particular scenario is shown for example in Axle groupings (c), (d) and (e) in the table below.

| Axle grouping | Vehicle Axle No. | | | | |
| --- | --- | --- | --- | --- | --- |
|  | 1 Front most | 2 | 3 | 4 | 5 Rear most |
| (a) | G1 | G1 | G1 | G2 | G2 |
| (b) | G2 | G2 | G1 | G1 | G1 |
| (c) | G1 | G2 | G1 | G2 | G1 |
| (d) | G1 | G2 | G2 | G1 | G1 |
| (e) | G2 | G1 | G1 | G2 | G1 |
| (f) | G2 | G1 | G1 | G1 | G2 |

Notwithstanding the possible variation in axles that form the respective groups of axles, the steering system can still be configured to steer one or more of the front most drive axles and one or more of rear most drive axles. It may be however that in some embodiments the one of the front drive axle and one of the rear drive axle are in the same group (for example in Axle grouping (c) in the table above) rather than different groups as shown in the specific embodiments of FIGS. 2 and 3.

Also, engine torque is not necessarily being imparted in series between axles in a specific group. For example, if the first group of axles were constituted by axles 18a, 18b and 20b, then the first drivetrain 26 could be modified by provision of a further drive shaft coupled between drive shaft 28b and the axle 20b; and the second drivetrain 28 be modified by removing the shafts 34 and 36 and coupling a further drive shaft between the shaft 33c and the differential 30e of axle 20c. So, in this example engine torque is delivered to axle 18b, then in parallel to both axles 18a and 20b. Indeed, even with the embodiment shown in FIG. 3 the second drivetrain 31 could be rearranged to impart torque from the engine 24 initially to the axle 20b then in parallel to axles 20a and 20c.

Where a vehicle has an even number of axles each of the first and second groups of axles may have the same number of axles. However, where a vehicle has an odd number of axles the axle groups may be arranged so that the number of axles in the first group and the second group differ by one.

In the claims which follow and in the preceding description of the disclosed heavy haul vehicle, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the disclosed heavy haul vehicle.

What is claimed is:

1. A heavy haul vehicle comprising:
a chassis capable of supporting a load to be transported by the vehicle;
at least four drive axles coupled to the chassis, the at least four drive axles comprising at least two frontward drive axles and at least two rearward drive axles;
a first engine and a second engine, both engines being side by side at a first end of the vehicle; and
the at least two frontward drive axles comprise a first frontward drive axle and a second frontward drive axle behind the first frontward drive axle such that the first frontward drive axle is between the first engine and the second frontward drive axle, and
the first engine is arranged to drive the first and the second frontward drive axles,
the first engine configured to impart torque through a drivetrain to the second frontward drive axle, and then from the second frontward drive axle to the first said frontward drive axle; and
the second engine is arranged to drive the at least two rearward drive axles; and
a steering system configured to steer one or more of the at least one of the frontward drive axles and at least one of the rearward drive axles.

2. The heavy haul vehicle of claim 1, wherein the at least one frontward drive axle comprises a first frontward drive axle and a second frontward drive axle behind the first frontward drive axle, and the first engine is arranged to drive the first and the second frontward drive axles.

3. The heavy haul vehicle of claim 1, wherein the steering system steers both the first and second frontward drive axles.

4. The heavy haul vehicle of claim 3, wherein the steering system comprises a front closed-loop steering control system arranged to steer the second frontward drive axle based on a steering angle of the first frontward drive axle.

5. The heavy haul vehicle of claim 3, wherein the steering system comprises a rear closed-loop steering control system configured to steer a steered rearward drive axle based on a or the steering angle of the first frontward drive axle.

6. The heavy haul vehicle of claim 5, comprising at least one non-steered drive axle disposed between the steered rearward drive axle and the frontward drive axles.

7. The heavy haul vehicle of claim 1, wherein the heavy haul vehicle is configured to be driven with power from only one of the first and second engines.

8. The heavy haul vehicle of claim 1, wherein the vehicle is a dump truck capable of transporting at least a 100 T payload.

9. The heavy haul vehicle of claim 1, wherein each drive axle supports two wheels at each end of the drive axle.

10. The heavy haul vehicle of claim 1, wherein each wheel supported by each drive axle comprises an 18.00R25 tire.

11. The heavy haul vehicle of claim 1, wherein the vehicle comprise five drive axles arranged one behind the other and the at least two frontward drive axles and the at least two rearward drive axles comprises: (a) three front most drive axles and two rear most drive axles; or (b) two front most drive axles and three rear most drive axles.

12. The heavy haul vehicle of claim 1, comprising a chassis extension coupling system at an end of the chassis releasably rigidly coupling a chassis extension, having an additional axle, to the chassis to enable an increase in load carrying capacity of the vehicle when the chassis extension is coupled to the chassis by the chassis extension coupling system.

13. A method of driving a haul vehicle comprising a chassis capable of supporting a container for transporting a load, the method comprising:
- driving at least two frontward drive axles coupled to the chassis with a first engine;
- driving at least two rearward drive axles coupled to the chassis with a second engine;
- wherein both engines are side by side at a first end of the vehicle; and
- steering one or more of the at least two of the frontward drive axles and at least one of the at least two rearward drive axles.

14. A heavy haul vehicle comprising:
- a chassis capable of supporting a load to be transported by the vehicle;
- five drive axles coupled to the chassis and arranged one behind the other the five drive axles arranged as either (a) three frontward drive axles and two rearward most drive axles; or (b) two frontward drive axles and three rearward drive axles;
- a first engine and a second engine supported side by side at one end of the chassis, the first engine arranged to drive each of the frontward drive axles, and the second engine arranged to provide drive past the frontward drive axles to drive each of the rearward drive axles.

15. A heavy haul vehicle comprising:
- a chassis capable of supporting a load to be transported by the vehicle;
- a first group of one or more first drive axles and a second group of one or more second drive axles each group of drive axles being coupled to the chassis;
- a first engine and a second engine supported side by side at one end of the vehicle, the first engine arranged to drive each axle in the first group of drive axles, and the second engine arranged to drive each axle in the second group drive axles, wherein drive from the second engine to the axles of the second group of drive axles is provided by a drivetrain passing at least one of the drive axles of the first group of drive axles; and
- a steering system configured to steer at least one of the first drive axles and at least one of second drive axles.

16. The heavy haul vehicle of claim 15, wherein the first drive axles comprises a front most drive axle and an adjacent drive axle behind the front most drive axle.

17. The heavy haul vehicle of claim 15, wherein the first drive axles comprises a front most drive axle and two further drive axles mutually adjacent each other and immediately behind the front most drive axle.

18. The heavy haul vehicle of claim 15 comprising five drive axles arrange one behind the other wherein the first group of drive axles comprises three first drive axles and the second group of axles comprises two second drive axles and one of the second drive axles is located between two of the first drive axles.

* * * * *